United States Patent
Seta et al.

(10) Patent No.: US 6,737,171 B2
(45) Date of Patent: May 18, 2004

(54) PROPYLENIC RANDOM COPOLYMER AND COMPOSITION COMPRISING IT, AND FILM COMPRISING THE COPOLYMER OR COMPOSITION

(75) Inventors: Yasushi Seta, Ichihara (JP); Satoshi Nakatsuka, Ichihara (JP); Michihiro Sawada, Himeji (JP); Ryoichi Tsunori, Ichihara (JP)

(73) Assignee: Idemitsu Petrochemical Co., Ltd. (JP)

( * ) Notice: Subject to any disclaimer, the term of this patent is extended or adjusted under 35 U.S.C. 154(b) by 33 days.

(21) Appl. No.: 10/301,708

(22) Filed: Nov. 22, 2002

(65) Prior Publication Data

US 2003/0120014 A1 Jun. 26, 2003

Related U.S. Application Data

(62) Division of application No. 08/975,183, filed on Nov. 20, 1997, now abandoned.

(30) Foreign Application Priority Data

Nov. 25, 1996 (JP) .............................. 8-313210

(51) Int. Cl.⁷ ........................ C08F 210/06; B32B 27/32
(52) U.S. Cl. ..................... 428/516; 428/34.9; 428/35.2; 428/35.7; 428/515; 526/348; 526/348.1
(58) Field of Search ................. 428/515, 516, 428/34.9, 35.2, 35.7; 526/348, 348.1

(56) References Cited

U.S. PATENT DOCUMENTS

| | | | |
|---|---|---|---|
| 4,414,373 A | 11/1983 | Shiga et al. | 526/348 |
| 4,668,753 A | 5/1987 | Kashuwa et al. | 526/348 |
| 4,774,292 A | 9/1988 | Thiersualt et al. | |
| 5,438,110 A | 8/1995 | Ishimaru et al. | 526/348 |
| 5,516,866 A | 5/1996 | Resceni et al. | 526/348 |
| 5,597,881 A | 1/1997 | Winter et al. | 526/348 |
| 5,618,895 A | 4/1997 | Kerth et al. | 526/348 |
| 5,929,147 A | 7/1999 | Pierick et al. | 524/99 |
| 6,130,305 A * | 10/2000 | Seta et al. | |
| 6,420,021 B1 * | 7/2002 | Seta et al. | |

FOREIGN PATENT DOCUMENTS

EP 341724 11/1989

* cited by examiner

*Primary Examiner*—Caixia Lu
(74) *Attorney, Agent, or Firm*—Parkhurst & Wendel, L.L.P.

(57) ABSTRACT

Provided are a propylenic random copolymer of propylene and ethylene satisfying the following (1) to (5), a composition comprising the copolymer, a film and a stretched film of the copolymer or its composition, and a laminate film and a stretched laminate film comprising at least one layer of the copolymer or its composition.

(1) The ethylene unit content (x, wt. %) of the copolymer is from 0.2 to 10 wt. %.

(2) The copolymer has a melt index (MI, g/10 min) of from 0.1 to 4 g/10 min.

(3) The relation between the boiling diethyl ether extraction (E, wt. %) of the copolymer and x satisfies the following (I) or (II);

$$E \leq 0.253x + 1.1 \quad (0.2 \leq x < 6) \quad (I)$$

$$E \leq 2.6 \quad (6 \leq x \leq 10) \quad (II)$$

(4) The relation between the melting point (Tm, °C.) of the copolymer as measured with a differential scanning calorimeter and x satisfies the following (III):

$$Tm \leq 165 - 5x \quad (III)$$

(5) The isotactic triad fraction (mm, mol %) in the PPP sequence of the copolymer, as measured in $^{13}$C-NMR, is not smaller than 98.0 mol %.

The films have good stiffness, low-temperature heat-sealability, heat-shrinkability, hot-slipping ability, anti-blocking ability and cold-slipping ability, and are favorably used as wrapping or packaging shrink films.

11 Claims, No Drawings

US 6,737,171 B2

PROPYLENIC RANDOM COPOLYMER AND COMPOSITION COMPRISING IT, AND FILM COMPRISING THE COPOLYMER OR COMPOSITION

This is a Division of application Ser. No. 08/975,183 filed Nov. 20, 1997 abandoned.

FIELD OF THE INVENTION

The present invention relates to a propylenic random copolymer and a composition comprising it, and also to their use. More precisely, it relates to a binary random copolymer of propylene and ethylene, and a composition comprising the copolymer, and also to a film, especially a stretched film and a stretched film laminate comprising the copolymer or composition.

BACKGROUND OF THE INVENTION

Having enveloped the objects to be wrapped or packaged, and heated under heat, shrink film is shrunk to thereby airtightly seal in the objects. With such a property, shrink film is much used in shrink wrapping or packaging, for example, for separately wrapping cupped instant noodles and for packaging a plurality of objects such as notebooks.

For such shrink wrapping or packaging, shrink film of polyvinyl chloride resins is used in the conventional art. The film is advantageous in that it produces good wrapping and packaging with neither wrinkles nor looseness, but is problematic in that it gives harmful hydrogen chloride gas when it is formed from the resins, when it is heat-sealed over the objects to be wrapped or packaged therewith and when it is incinerated. For these reasons, it is desired to produce shrink film from polyolefinic resins that are free from those problems.

As having high stiffness, transparency and moisture-proofness, film of polyolefinic resins, especially that of crystalline propylenic polymers, is much used as wrapping or packaging film. However, for use in shrink wrapping or packaging, film of propylene homopolymers is problematic in that the heat-sealing step for it could not be finished rapidly and the temperature in the heat-shrinking step for it must be high, since the melting point of the film is high.

Given that situation, in order to improve the heat-sealability and the heat-shrinkability of the film of polypropylenic resins in shrink wrapping or packaging, some techniques have heretofore been proposed of copolymerizing propylene with ethylene and other α-olefins to give polyolefinic resins that are favorably usable in shrink wrapping or packaging. For example, one technique is to copolymerize propylene with a large amount of ethylene and other α-olefins to give crystalline propylenic polymers, of which the heat-sealability and heat-shrinkability is said to be improved to such a degree that the film of the polymers is favorably usable in shrink wrapping or packaging. However, since the crystalline propylenic polymers are formed through copolymerization of such a large amount of ethylene and other α-olefins, they shall contain a large amount of unfavorable sticky side products and, in addition, their crystallinity is poor. Therefore, the film of those polymers have low stiffness, poor anti-blocking ability and poor hot-slipping ability, resulting in that it could not be used as shrink film for wrapping or packaging.

In order to remove the sticky components from the crystalline propylenic resins, a method has been tried of processing the resins with inert solvents to dissolve out the components. In this method, however, the crystalline, low-melting-point components are also dissolved out, resulting in that the film of the thus-processed resins could not have good heat-sealability and heat-shrinkability at low temperatures and is unfavorable for shrink wrapping or packaging.

Resins for shrink wrapping or packaging film are required to have other various properties. For example, the necessary properties of those resins include biaxial stretchability in tenter methods and tubular methods, slippability and anti-blocking ability in the re-winding step in the stretching process, and good outward appearance and transparency of film of the resins. In addition to those, the resins must be applicable to large-scaled, high-speed filming machines which are used recently for improving the producibility of film.

SUMMARY OF THE INVENTION

One object of the present invention is to provide a binary random copolymer of propylene and ethylene capable of being sheeted into films that are favorably used as various wrapping and packaging films with good stretchability while having the intrinsic good characteristics of polypropylene films, and to provide a resin composition comprising the copolymer. Another object of the invention is to provide a film and a multi-layered laminate film with good low-temperature heat-sealability that is formed from the copolymer or the resin composition, especially a stretched film and a stretched multi-layered laminate film with good heat-shrinkability.

We, the present inventors have assiduously studied in order to attain the above-mentioned objects of the invention and, as a result, have found that a propylenic random copolymer and its composition having specific characteristics such as those mentioned below are favorably used for those objects, and that films of various forms, such as a single-layered film, a stretched single-layered film, a multi-layered laminate film, and a stretched multi-layered film comprising the copolymer or its composition have good characteristics which could not be found in any conventional polymer films. On the basis of those findings, we have completed the present invention.

Specifically, the invention provides the following:

[1] A propylenic random copolymer of propylene and ethylene, which satisfies the following (1) to (5):

(1) The ethylene unit content (x, wt. %) of the copolymer is from 0.2 to 10 wt. %.

(2) The copolymer has a melt index (MI, g/10 min) of from 0.1 to 4 g/10 min.

(3) The relation between the boiling diethyl ether extraction (E, wt. %) of the copolymer and x satisfies the following (I) or (II):

$$E \leq 0.25x + 1.1 \quad (0.2 \leq x < 6) \quad \text{(I)}$$

$$E \leq 2.6 \quad (6 \leq x \leq 10) \quad \text{(II)}$$

(4) The relation between the melting point (Tm, °C.) of the copolymer as measured with a differential scanning calorimeter and x satisfies the following (III):

$$Tm \leq 165 - 5x \quad \text{(III)}$$

(5) The isotactic triad fraction (mm, mol %) in the PPP sequence of the copolymer, as measured in $^{13}$C-NMR, is not smaller than 98.0 mol %.

Preferably, the propylenic random copolymer further satisfies the following (6):

(6) The relation between the melt index (MI, g/10 min) of the copolymer and the time of relaxation ($\tau$, sec) of the copolymer as obtained through frequency dispersion measurement at a frequency $\omega 0 = 10^0$ rad/sec satisfies the following (IV):

$$\tau \geq 0.523 - 0.077 \log MI \quad (IV)$$

[2] A propylenic random copolymer composition comprising from 60 to 95% by weight of the propylenic random copolymer of [1] and from 5 to 40% by weight of a polyolefinic polymer.

[3] A film of the propylenic random copolymer of [1] or the composition of [2]; a stretched film to be prepared by stretching the film; a multi-layered film laminate comprising at least one layer of the propylenic random copolymer or the composition; and a stretched multi-layered film laminate as prepared by stretching the film laminate. Especially, a multi-layered film laminate and a stretched multi-layered laminate film comprising at least one layer of the propylenic random copolymer or its composition, and one or more layers of other thermoplastic resins.

[4] The multi-layered laminate film or stretched multi-layered laminate film of [3], in which the layer of the propylenic random copolymer [1] or its composition [2] is the outermost layer of at least one surface of the film.

PREFERRED MODES OF CARRYING OUT THE INVENTION

Now, the invention is described in detail hereinunder.

The propylenic random copolymer of the invention is prepared through copolymerization of propylene and ethylene, and satisfies the following (1) to (5):

(1) The ethylene unit content (x, wt. %) of the copolymer is from 0.2 to 10 wt. %, preferably from 2 to 6% by weight. If x is smaller than 0.2% by weight, the heat-sealing temperature of the copolymer could not be satisfactorily lowered. If so, in addition, the film of the copolymer could not be satisfactorily shrunk under heat. On the other hand, if x is larger than 10% by weight, the crystallinity of the copolymer is low and the stiffness thereof is poor.

(2) The copolymer has a melt index (MI, g/10 min) of from 0.1 to 4 g/10 min. If its MI is lower than 0.1 g/10 min or higher than 4 g/10 min, the copolymer will be poorly sheeted to give failures.

(3) The relation between the boiling diethyl ether extraction (E, wt. %) of the copolymer and x satisfies the following (I) or (II):

$$E \leq 0.25x + 1.1 \quad (0.2 \leq x < 6) \quad (I)$$

$$E \leq 2.6 \quad (6 \leq x \leq 10) \quad (II)$$

If E oversteps the defined range, the antiblocking property of the copolymer is poor, and, in addition, the heat-sealing temperature of the copolymer is not satisfactorily lowered.

Preferably, the relation between the two satisfies the following (I)' or (II)':

$$E \leq 0.2x + 1.1 \quad (0.2 \leq x < 6) \quad (I)'$$

$$E \leq 2.3 \quad (6 \leq x 10) \quad (II)'$$

(4) The relation between the melting point (Tm, ° C.) of the copolymer as measured with a differential scanning calorimeter and x satisfies the following (III):

$$Tm \leq 165 - 5x \quad (III)$$

If Tm is larger than the range, the heat-sealing temperature of the copolymer is not satisfactorily lowered, and, in addition, the thermal shrinkage of the copolymer is poor.

Preferably, the relation between the two satisfies the following (III)':

$$Tm \leq 162 - 5x \quad (III)'$$

(5) The isotactic triad fraction (mm, mol %) in the PPP sequence of the copolymer, as measured in $^{13}$C-NMR, is not smaller than 98.0 mol %, preferably not smaller than 98.5 mol %. P indicates the propylene unit in the copolymer.

If its mm fraction is smaller than 98 mol %, the copolymer shall have a large content of sticky components, resulting in that its anti-blocking ability is lowered. If so, in addition, the crystallinity and the stiffness of the copolymer are both lowered. Moreover, the degree of lowering of the melting point of the copolymer, relative to its ethylene content, is small, often resulting in that the heat-sealing temperature of the copolymer is relatively high.

If the copolymer of which the mm fraction is outside the defined range is formed into shrink film, the hot slippability of the film with which objects have been wrapped or packaged is poor.

Preferably, the propylenic random copolymer of the invention further satisfies the following (6):

(6) The relation between the melt index (MI, g/10 min) of the copolymer and the time of relaxation ($\tau$, sec) of the copolymer as obtained through frequency dispersion measurement at a frequency $\omega 0 = 10^0$ rad/sec satisfies the following (IV):

$$\tau \geq 0.523 - 0.077 \log MI \quad (IV)$$

If $\tau$ is smaller than the defined range, the copolymer is poorly sheeted to give failures. In particular, when the polymer is sheeted while being stretched, many failures are formed.

Preferably, the relation between the two satisfies the following (IV)':

$$\tau \geq 0.540 - 0.077 \log MI \quad (IV)'$$

The propylenic random copolymer of the invention that satisfies the preferred relation can be formed into films having much better low-temperature heat-sealability, stiffness, anti-blocking ability and slippability without interfering with the good characteristics intrinsic to polypropylene films. In addition, the films of the copolymer can be stretched smoothly, and the copolymer is favorable for producing stretched films.

The propylenic random copolymer of the invention has by itself good characteristics such as those mentioned hereinabove. However, when combined with inexpensive polyolefinic polymers, not only the cost of the resulting polymer compositions is lowered but also the heat-sealing temperature of the composition is further lowered and the heat-seal strength thereof is further increased.

Accordingly, the invention further provides a propylenic random copolymer composition comprising from 60 to 95% by weight of the specific propylenic random copolymer and from 5 to 40% by weight of an additional polyolefinic polymer, preferably from 80 to 95% by weight of the former and from 5 to 20% by weight of the latter. If, however, the additional polyolefinic polymer content of the composition is larger than 40% by weight, the low-temperature heat-sealability, anti-blocking ability and stiffness of the composition will rather be poor. If smaller than 5% by weight, the addition of the polyolefinic polymer could not exhibit its effect of improving the heat-sealability of the composition.

The polyolefinic polymer to be in the propylenic random copolymer composition includes, for example, ethylene homopolymers, ethylene-α-olefin copolymers, propylene homopolymers, propylene-α-olefin copolymer, and homopolymers of $C_{4-10}$ α-olefins.

Concretely, the ethylene homopolymers include high-density polyethylene, middle-density polyethylene, and low-density polyethylene; the propylene homopolymers include isotactic polypropylene, and syndiotactic polypropylene; and the homopolymers of $C_{4-10}$ α-olefins include polybutene and polymethylpentene.

The ethylene-α-olefin copolymers include copolymers of ethylene and one or more $C_{3-10}$ α-olefins (excepting the propylenic random copolymer of the invention). The α-olefins constituting those copolymers include linear monoolefins such as propylene, 1-butene, 1-hexene, 1-octene, 1-nonene, and 1-decene; branched monoolefins such as 3-methyl-1-butene, 3-methyl-1-pentene, and 4-methyl-1-pentene; and monoolefins substituted with aromatic groups such as styrene. The ethylene-α-olefin copolymers usable in the invention may comprise one or more such α-olefin comonomers.

The propylene-α-olefin copolymers include copolymers of propylene and one or more $C_{4-10}$ α-olefins. The α-olefins constituting those copolymers include linear monoolefins such as 1-butene, 1-hexene, 1-octene, 1-nonene, and 1-decene; branched monoolefins such as 3-methyl-1-butene, 3-methyl-1-pentene, and 4-methyl-1-pentene; and monoolefins substituted with aromatic groups such as styrene. One or more those α-olefins can be copolymerized to give the copolymers.

Of those, preferred are ethylene-$C_{4-10}$ α-olefin copolymers, propylene-1-butene copolymers, and propylene-ethylene-1-butene terpolymers. More preferred are ethylene-$C_{4-8}$ α-olefin copolymers, typically so-called LLDPE. These copolymers preferably have MI of from 0.1 to 4 g/10 min.

The method for producing the propylenic random copolymer of the invention is described hereinunder.

The propylenic copolymer can be produced under specific polymerization conditions in the presence of specific catalysts, for example, in the manner mentioned hereinunder. However, such specific conditions and specific catalysts are not limitative.

The catalysts usable in producing the propylenic copolymer comprise, for example, (a) a solid catalyst component (a) consisting essentially of magnesium, titanium and a halogen, (b) a catalyst component of an organic metal compound such as an organic aluminium compound, and (c) a catalyst component of an electron donor compound such as an organic silicon compound. Concretely, the following catalyst components are employable herein.

(a) Solid Catalyst Component:

Preferred carriers for the solid catalyst component can be obtained by reacting a metal magnesium, an alcohol, and a halogen and/or a halogen-containing compound.

The metal magnesium may be in any form of granular, ribbon-like, or powdery ones. Preferably, the metal magnesium is not coated with any substance other than metal magnesium, such as magnesium oxide.

The alcohol is preferably a lower alcohol having from 1 to 6 carbon atoms, such as methanol or ethanol. Especially preferred is ethanol, as easily giving good catalysts having high activity.

The halogen is preferably chlorine, bromine or iodine. Of those, especially preferred is iodine. As the halogen-containing compound, preferably used is $MgCl_2$ or $MgI_2$.

The amount of the alcohol to be used is preferably from 2 to 100 mols, more preferably from 5 to 50 mols, per mol of the metal magnesium.

The amount of the halogen or halogen-containing compound to be used may be generally 0.0001 gram-atoms or more, preferably from 0.0005 to 0.1 gram-atoms, especially preferably from 0.001 to 0.06 gram-atoms or more, in terms of the amount of the halogen atom itself or of the amount of the halogen atom in the halogen-containing compound, relative to 1 gram-atom of the metal magnesium. One or more halogens or halogen-containing compounds can be used either singly or as combined.

The carrier of the catalyst for use in the invention can be obtained generally by reacting the metal magnesium, alcohol, and halogen and/or halogen-containing compound, for example, under reflux (at about 79° C.) until hydrogen gas is no more formed, generally for from 20 to 30 hours. This reaction is preferably effected in an inert gas atmosphere such as nitrogen gas or argon gas.

The thus-obtained carrier is filtered out and dried, optionally after having been washed with an inert solvent such as heptane, and is used in producing the solid catalyst component (a).

Preferably, the carrier is nearly granular, while having a narrow grain size distribution to give a sharp peak. More preferably, the variation in the shape of each grain constituting the carrier is as small as possible. Concretely, the sphericity (S) of each grain to be represented by the following (V) is preferably less than 1.60, more preferably less than 1.40, and the grain size distribution index (P) to be represented by the following (VI) is preferably less than 5.0, more preferably less than 4.0.

$$S=(E1/E1)^2 \qquad (V)$$

wherein E1 indicates the length of the projected border line of each grain; and E2 indicates the circumference of the circle of which the area is the same as the projected area of each grain.

$$P=D90/D10 \qquad (VI)$$

wherein D90 indicates a grain size corresponding to the weight cumulative fraction of 90%. In other words, D90 means that the weight sum of the grains having a grain size smaller than the grain size represented by D90 is 90% of the total weight sum of all grains. The same shall apply also to D10.

The solid catalyst component is produced by contacting the carrier with at least a titanium compound.

The titanium compound may be one represented by a general formula (VII):

$$TiX^1_n(OR^1)_{4-n} \qquad (VII)$$

wherein $X^1$ represents a halogen atom, especially preferably a chlorine atom; $R^1$ represents a hydrocarbon group having from 1 to 10 carbon atoms, especially preferably a linear or branched alkyl group, and plural $R^1$'s, if any, may be the same or different; and n is an integer of from 0 to 4.

Concretely, the titanium compound includes $Ti(O\text{-}i\text{-}C_3H_7)_4$, $Ti(O-C_4H_9)_4$, $TiCl(O-C_2H_5)_3$, $TiCl(O\text{-}i\text{-}C_3H_7)_3$, $TiCl(O-C_4H_9)_3$, $TiCl_2(O-C_4H_9)_2$, $TiCl_2(O\text{-}i\text{-}C_3H_7)_2$, $TiCl_4$. Of those, especially preferred is $TiCl_4$.

Generally, the solid catalyst component is produced by further contacting the carrier with an electron donor compound.

The electron donor compound is preferably an aromatic dicarboxylate, especially preferably di-n-butyl phthalate and di-ethyl phthalate.

While the carrier is contacted with the titanium compound and the electron donor compound, in general, it is further contacted with a halogen-containing silicon compound. The halogen-containing silicon compound is preferably silicon tetrachloride.

The solid catalyst compound can be produced in any known manner. For example, the carrier is added to a solvent along with an electron donor compound and a halogen-containing silicon compound such as those mentioned above, then a titanium compound such as that mentioned above is added thereto with stirring, and all those are reacted. The solvent is preferably an inert hydrocarbon such as pentane, hexane, heptane or octene. The electron donor compound is used generally in an amount of from 0.01 to 10 mols, preferably from 0.5 to 5 mols, per mol of the carrier in terms of the magnesium atom; and the titanium compound is used generally in an amount of from 1 to 50 mols, preferably from 2 to 20 mols, per mol of the carrier in terms of the magnesium atom. The reaction is effected by contacting the components with each other, generally at a temperature falling between 0 and 200° C. for from 5 minutes to 10 hours, preferably between 30 and 150° C. for from 30 minutes to 5 hours.

After the reaction, it is preferred that the solid catalyst component formed is washed with an inert hydrocarbon (e.g., n-hexane, n-heptane).

(b) Organic Metal Catalyst Component:

Of the catalyst components, the organic metal compound is preferably an organic aluminium compound.

For this, widely used are organic aluminium compounds of the following general formula (VIII):

$$AlR^2_n X^2_{3-n} \quad \text{(VIII)}$$

wherein $R^2$ represents an alkyl group having from 1 to 10 carbon atoms, a cycloalkyl group, or an aryl group; $X^2$ represents a halogen atom and is preferably a chlorine or bromine atom; and n is an integer of from 1 to 3.

Concretely, the compounds include trialkyl aluminium compounds such as trimethyl aluminium, triethyl aluminium, triisobutyl aluminium; and also diethylaluminium monochloride, diisobutylaluminium monochloride, diethylaluminium monoethoxide, ethylaluminium sesquichloride, etc. Of those, preferred are triethyl aluminium and triisobutyl aluminium. One or more of those compounds can be used either singly or as combined.

(c) Electron Donor Compound:

Of the catalyst components, the electron donor compound to act on the polymerization system is preferably an organic silicon compound. Especially preferred are dicyclopentyldimethoxysilane and cyclohexylmethyldimethoxysilane.

The solid catalyst component is used in the intended polymerization, preferably after having been pre-treated. To pre-treat it, preferably, it is reacted with a small amount of propylene introduced, under the condition of the existence of the solid catalyst component, organic metal compound and an electron donor compound such as those mentioned hereinabove with stirring them. Where the solid catalyst component and so on are put into the reactor, it is preferable that those components are solved in a proper solvent before being put into to avoid the solid catalyst component from adhering to inner wall of the reactor. The solvent is preferably discharged from the reactor at latest up to the initial stage of the reaction. Such a solvent is preferably an inert hydrocarbon such as pentane, hexane, heptane, octene or the like. The organic metal compound is used in an amount of generally from 0.01 to 10 mols, preferably from 0.05 to 5 mols, per mol of the titanium atom in the solid catalyst component; and the electron donor compound is used in an amount of generally from 0.01 to 20 mols, preferably from 0.1 to 5 mols, per mol of the titanium atom in the solid catalyst. Propylene is added to the catalyst system at a propylene partial pressure higher than an atmospheric pressure, with which the solid catalyst is pre-treated preferably at from 0 to 100° C. for from 0.1 to 24 hours. After the reaction, preferably, the pre-treated catalyst is washed with an inert hydrocarbon such as n-hexane or n-heptane.

The propylenic random copolymer of the invention is produced, for example, by feeding predetermined amounts of propylene and ethylene under the existence of the solid catalyst component, the organic metal compound and the electron donor compound all mentioned above and reacting with stirring. The solid catalyst component used in the intended polymerization is preferably put into a reactor after solving them to a proper solvent such as the above-mentioned inert hydrocarbon to avoid the solid catalyst component from adhering to inner wall of the reactor. The solvent is preferably discharged from the reactor at latest up to the initial stage of the reaction. The polymerization is generally taken place under the condition that, for example, the monomers are copolymerized generally at a propylene partial pressure not lower than an atmospheric pressure, preferably between atmospheric pressure and 40 kg/cm², and at a temperature falling between –80 and 150° C., preferably between 20 and 150° C. The organic metal compound is used generally in an amount of from 0.1 to 400 mols, preferably from 1 to 200 mols, per mol of the titanium atom in the solid catalyst component; and the electron donor compound is used generally in an amount of from 0.1 to 100 mols, preferably from 1 to 50 mols, per mol of the titanium atom in the solid catalyst.

The ethylene content of the propylenic random copolymer of the invention shall be changed by controlling the ethylene partial pressure and the amount of ethylene to be fed into the polymerization system; and the molecular weight of thereof shall be changed by controlling the amount of hydrogen to be introduced into the polymerization system.

According to the above-mentioned method, ethylene can be randomly copolymerized with propylene while ensuring the high stereospecificity of the PPP sequence of the resulting propylenic random copolymer, resulting in that the copolymer shall have a high crystallinity and a low melting point. In addition, since the copolymerizability of the comonomer, ethylene is good in the method, the melting point of the resulting copolymer may well be lowered even when a small amount of the comonomer is used.

Moreover, since the ethylene molecules are introduced relatively uniformly into the propylenic random copolymer, the ethylene content of the copolymer is unified and the ethylene content distribution in the copolymer is narrow. Accordingly, the propylenic random copolymer of the invention thus produced in the method shall contain a reduced amount of sticky components that cause the blocking of films of the copolymer. The sticky components in the copolymer are measured in terms of the boiling diethyl ether-soluble content of the copolymer. In addition, the films of the copolymer have good stretchability, as will be demonstrated hereinunder, and the stretched films have good heat-shrinkability.

The polyolefinic polymers to be in the propylenic random copolymer composition of the invention can be produced in any known method in which is used a so-called Ziegler- Natta catalyst system which comprises a solid catalyst of a titanium compound-carrying magnesium halide compound and an organic aluminium compound optionally along with an electron donor. In addition, those polymers can also be produced in a different known method in which is used a so-called metallocene catalyst which comprises a transition metal compound as coordinated with at least one cyclopentadienyl group or its derivative, and an aluminoxane or a compound capable of forming ionic complex with the transition metal compound.

The propylenic random copolymer and its composition of the invention may be mixed with any other optional additives in any known method using, for example, a tumbler blender or a Henschel mixer, then optionally melt-kneaded, for example, in a single-screw extruder, a double-screw extruder, a kneader or a Bumbury mixer, and thereafter further optionally granulated into pellets, which may be sheeted into films.

The optional additives include, for example, antioxidants, neutralizing agents, lubricants, anti-blocking agents, and antistatic agents.

Now described in detail hereinunder are films and stretched films of the propylenic random copolymer or its composition; and multi-layered laminate films and stretched multi-layered laminate films comprising at least one layer of the film or stretched film preferably as the outermost layer.

The film is produced from the propylenic random copolymer or its composition through any known melt extrusion. The stretched film is prepared by monoaxially or biaxially stretching the non-stretched film. The stretched film is preferably a biaxially stretched one.

For the melt extrusion, preferably employed is a T-die casting method or an inflation sheeting method.

The non-stretched film thus prepared may be stretched to give a stretched film. The non-stretched film prepared in a T-die casting method may be stretched generally in a tenter method; while that prepared in an inflation sheeting method may be stretched generally in a tubular method. In those stretching methods, the non-stretched film is biaxially stretched by from 1.5 to 20 times, preferably from 2 to 15 times. In the tenter method, the film may be simultaneously stretched in the lengthwise and widthwise directions, or alternatively, it may be first stretched in the lengthwise direction and then in the widthwise direction, and vise versa. The thickness of the non-stretched film may be generally from 100 to 700 μm, preferably from 200 to 500 μm.

The heating condition for the stretching and the stretching speed may be suitably determined, depending on the ethylene content and the MI value of the propylenic random copolymer, the type and the amount of the polyolefin in the copolymer composition, the thickness of the non-stretched film and the stretching magnification.

The multi-layered laminate film of the invention comprises at least one layer of the propylenic random copolymer or its composition and one or more layers of other thermoplastic resins. The stretched multi-layered laminate film of the invention is prepared by monoaxially or biaxially stretching the non-stretched multi-layered laminate film. Preferably, the stretched multi-layered laminate film is a biaxially stretched one.

The other thermoplastic resins include, for example, polyolefin resins such as polypropylene, polyester resins, and ethylene-vinyl acetate copolymers (EVA). The stretched multi-layered laminate film of the invention comprises at least one film layer of the propylenic random copolymer or its composition of the invention. Preferably, at least the outermost layer of one surface of the laminate film is the film layer of the propylenic random copolymer or its composition of the invention, which functions as a sealant layer.

To produce the multi-layered laminate film of the invention, for example, the constituent films to be laminated are separately prepared through melt extrusion such as that mentioned hereinabove, and then laminated together through known dry lamination; or alternatively, those constituent films are co-extruded, while being integrated into a laminate, through a known co-extruder provided with a plurality of co-extrusion dies. The thus-obtained, non-stretched laminate film may be stretched in the same manner as above to give a stretched, multi-layered laminate film. The thickness of the non-stretched laminate film may be generally from 100 to 700 μm, preferably from 200 to 500 μm.

The propylenic random copolymer and its composition have good stretchability and are stable while being sheeted into films. Therefore, these are applicable to up-to-date, large-scaled, high-speed sheeting machines.

The films of the invention have good stiffness, low-temperature heat-sealability, hot-slipping ability, anti-blocking ability, and cold-slipping ability. The multi-layered laminate films comprising at least one layer of the film have good stiffness. In particular, those comprising the film layer of the propylenic random copolymer or its composition as the outermost layer have good low-temperature heat-sealability, hot-slipping ability, anti-blocking ability, and cold-slipping ability. Therefore, those films are extremely useful as wrapping and packaging films with many uses.

The stretched films of the invention also have good stiffness, low-temperature heat-sealability, hot-slipping ability, anti-blocking ability, and cold-slipping ability, and additionally have good heat shrinkability. The stretched multi-layered laminate films comprising at least one such stretched film layer have good stiffness and heat shrinkability. In particular those comprising the film layer of the propylenic random copolymer or its composition as the outermost layer have good low-temperature heat-sealability, hot-slipping ability, anti-blocking ability, and cold-slipping ability. Therefore, those stretched films are extremely useful as wrapping and packaging films with many uses, in particular as wrapping or packaging shrink films.

Now, the invention is described in more detail with reference to the following Examples, which, however, are not intended to restrict the scope of the invention.

First mentioned are the methods for determining the characteristics of resins, the method of forming films, and the methods for evaluating the quality of films.

(A) Methods for Determining the Characteristics of Resins:

1) Ethylene Content of Copolymer (x, wt. %):

To determine the ethylene content of a copolymer, the copolymer is sheeted into a film having a thickness of 300 μm under the condition mentioned below, and the absorbance of the film at 718 and 733 $cm^{-1}$ was measured with FT/IR5300 (manufactured by Nippon Bunko KK). From the absorbance thus measured, the ethylene content, x, of the copolymer was obtained in accordance with the equations mentioned below.

Sheeting Condition:
    Press temperature: 220° C.
    Pressure at Hot press or cold press: 50 kg/cm²G
    Period of pre-heating: 5 min
    Period of hot press: 5 min
    Period of cold press: 3 min IR Condition:
  Number of integration: 20
  Resolution: 4 cm$^{-1}$
Ethylene Content (x, wt. %):

$$x1=0.599\times(A733/d\cdot l)-0.161\times(A718/d\cdot l)$$

$$x2=0.599\times(A718/d\cdot l)-0.161\times(A733/d\cdot l)$$

$$x=0.809\times(x1+x2)$$

wherein;
  A718 is an absorbance at 718 cm$^{-1}$;
  A733 is an absorbance at 733 cm$^{-1}$;
  d is 0.9; and
  l is the thickness of the sample.

2) Melt Index (MI, g/10 min):
  The melt index of a copolymer was measured at a temperature of 230° C. and under a load of 2160 g, according to JIS K7210.

3) Boiling Diethyl Ether Extraction (E, wt. %):
  3 g of pellets of a copolymer sample that had been ground to pass through a 1 mm φ mesh were put into a cylindrical filter, while 160 ml of an extraction solvent of diethyl ether was put into a flat bottom flask. The pellets were extracted with the solvent, using a Soxhlet's extractor, at a reflux frequency of 1 time/5 min or so for 10 hours. After the extraction, diethyl ether was recovered, using an evaporator, and then dried in a vacuum drier to have a constant weight, from which was obtained the boiling diethyl ether extraction of the sample.

4) Melting Point of Copolymer as Measured with Differential Scanning Calorimeter (Tm, ° C.):
  Using a differential scanning calorimeter (DSC7, manufactured by Perkin-Elmer Co.), 10 mg of a copolymer sample was first melted in a nitrogen atmosphere at 230° C. for 3 minutes, and then cooled to 40° C. at a cooling rate of 10° C./min. Then, the sample was kept at 40° C. for 3 minutes, and then heated at a heating rate of 10° C./min to obtain a melting endothermic curve of the sample. The peak top of the highest peak of the curve indicates the melting point of the sample.

5) Isotactic Triad Fraction in the PPP Sequence of Copolymer and Film as Measured in $^{13}$C-NMR (mm, mol %):
  The isotactic triad fraction in the PPP sequence of the propylenic copolymer or the propylenic copolymer film of the invention indicates the isotactic fraction of the triad units in the PPP sequence of the copolymer molecular chains constituting the propylenic copolymer or the propylenic copolymer film, and can be obtained from the $^{13}$C-NMR spectrum of the copolymer or the film.

The fraction, mm, of a propylene homopolymer can be obtained from the following equation (IX):

$$mm=[Imm/(Imm+Imr+Irr)]\times 100 \text{ (mol \%)} \qquad (IX)$$

wherein Imm, Imr and Irr each indicate the peak intensity in each of three methyl carbon regions, mm, mr and rr, respectively, in the $^{13}$C-NMR spectrum of the homopolymer sample. The mm region falls between 21.4 and 22.2 ppm of the chemical shifts; the mr region falls between 20.6 and 21.4 ppm of the chemical shifts; and the rr region falls between 19.8 and 20.6 ppm of the chemical shifts.

On the other hand, in the $^{13}$C-NMR spectrum of a propylenic random copolymer, the chemical-sift of the methyl carbon in the propylene unit is influenced by the adjacent ethylene unit. Concretely, the absorption peak derived from the methyl carbon of the propylene unit existing in the EPE sequence of the copolymer appears in the rr region, while the absorption peak derived from the methyl carbon of the propylene unit existing in the center of the PPE sequence of the copolymer appears in the mr region.

The absorption peak intensity derived from the methyl carbon of the propylene unit existing in the EPE sequence corresponds to the peak intensity for Tδδ (33.3 ppm). The absorption peak intensity derived from the methyl carbon of the propylene unit existing in the center of the PPE sequence corresponds to the peak intensity for Sαγ (38.0 ppm).

To obtain the isotactic triad fraction, mm, in the PPP sequence of the propylenic random copolymer, used is the following equation (X):

$$mm=Imm/[Imm+(Imr-S\alpha\gamma)+(Irr-T\delta\delta)]\times 100 \text{ (mol \%)} \qquad (X)$$

The $^{13}$C-NMR spectrum of the copolymer sample was obtained, using an NMR device, JNM-EX400 Model (manufactured by Nippon Electronic Co.) under the condition mentioned below.
  Sample concentration: 220 mg/3 ml of NMR solvent
  NMR solvent: 1,2,4-trichlorobenzene/deuterated benzene (90/10, vol %)
  Temperature: 130° C.
  Pulse width: 45°
  Pulse frequency: 4 seconds
  Number of integration: 4000

6) Time of Relaxation (τ, sec):
  Using a rotary rheometer (manufactured by Rheometrics Co.), a copolymer sample as put on a Cohn plate (diameter 25.0 mm; Cohn angle 0.10 radians) was subjected to frequency dispersion at a temperature of 175° C. and at a frequency $\omega_0=10^0$ rad/sec. The time of relaxation of the sample (τ, sec) was obtained as follows:

$$G^*(i\omega)=s^*/g^*=G'(\omega)+iG''(\omega)$$

where;
  $G^*(i\omega)$ indicates a complex modulus of visco-elasticity of the sample, which is defined by $\sigma^*/\gamma^*$;
  $\sigma^*$ indicates the stress of the sample;
  $\gamma^*$ indicates the strain of the sample.

$$\tau(\omega)=G'(\omega)/\omega G''(\omega)$$

where;
  ω indicates the frequency (rad/sec);
  G' indicates the storage modulus of elasticity;
  G" indicates the loss modulus of elasticity.

(B) Method of Forming Non-Stretched Films:
  Pellets of the propylenic random copolymer or its composition as obtained in the following Examples and Comparative Examples were sheeted into films at a resin temperature of 230° C., using a inflation sheeting machine comprising three 40 mmφ extruders and circular 50 mmφ dies. To produce multi-layered laminate films, different copolymers or compositions corresponding to the constituent layers were used.
  The amount of the resin to be extruded and the film taking-up speed were determined on the basis of the thickness of the final film and the stretching magnification for the film, falling between 10 and 60 kg/hr and between 3 and 20 m/min, respectively.

(C) Method of Forming Stretched Films:
  Using a tubular film stretching machine comprising two pairs of upper and lower nip rolls and two heating furnaces, pre-heating furnace and main heating furnace, as disposed between those pairs of nip rolls, the non-stretched, tubular films obtained in (B) were stretched under heat to obtain stretched films. The non-stretched multi-layered laminate films were stretched in the same manner to obtain stretched multi-layered laminate films.

Regarding the stretching condition, the temperature of each heating furnace was so controlled that the surface of the non-stretched film might be between 100 and 120° C. just before being stretched, and the thus-heated film was stretched biaxially to a stretching magnification, MD×TD, of 30 times. For the biaxial stretching magnification, the combination of the lengthwise stretching magnification (in machine direction, MD) and the widthwise stretching magnification (in transverse direction, TD) may be suitably determined so that the bubble stability could be the best. In this, the biaxial stretching magnification was minutely controlled on the basis of the standard MD magnification of 6 times and the standard TD magnification of 5 times.

(D) Annealing of Stretched Films:

In the tubular film stretching machine, the stretched film and the stretched multi-layered laminate film were annealed at 70° C. for 10 seconds.

(E) Evaluation of Quality of Films:

After each film sample was conditioned at a temperature of 23±2° C. and at a humidity of 50±10% for 16 hours or longer, it was tested to evaluate its film quality with respect to the following characteristics at the temperature and the humidity.

1) Heat-Sealability:

The heat-sealability of each film sample was evaluated according to JIS K-1707. The heat-sealing condition is mentioned below. The temperature of the heat-sealing bar was calibrated as its surface temperature, using a surface thermometer. After having been heat-sealed, the sample was left at room temperature for one full day, and thereafter peeled at room temperature and at a peeling speed of 200 mm/min in a T-shape peeling method to obtain its peeling strength. The heat-sealing temperature was obtained from the sealing temperature-peeling strength curve to give a peeling strength of 300 g/15 min.

Sealing Time: 1 sec
Area Sealed: 15×10 mm
Sealing Pressure: 2 kg/cm$^2$
Sealing Temperature: several points for interpolation of heat-sealing temperature 2) Thermal Shrinkage:

Each film sample was cut into test strips having a width of 15 mm and a length of 200 mm, which were marked at two points with a distance of 100 mm therebetween in the lengthwise direction. Those test strips were dipped in a glycerin bath conditioned at a temperature of 80, 100 or 120° C., for 10 seconds, then taken out, and cooled at room temperature for 5 minutes, whereupon the distance (mm) between the two marked points in each sample was measured. The thermal shrinkage of the sample was obtained from the following equation.

Thermal Shrinkage (%)=[(100−distance between the marks in the dipped sample)/100]×100

3) Outward Appearance of Shrink-Wrapped Objects:

Cupped instant noodles and paper boxes were somewhat loosely wrapped with each film sample, and the opening of the wrapping film was sealed. The thus-wrapped objects were put on a conveyor and passed through a hot air-circulating heating furnace, NS-350 Type (manufactured by Kyowa Electric Co.) (this is hereinafter referred to as a shrink tunnel), whereby the wrapping film was shrunk. The outward appearance of the wrapped objects was visually observed with respect to the shape of the corners and the wrinkles formed at the corners.

4) Hot-Slipping Characteristic:

Immediately after having been passed through the shrink tunnel, two wrapped objects were kept in contact with each other, whereupon the presence or absence of the blocking of the two was checked. In addition, while being passed through the shrink tunnel, the conveyor was checked as to whether or not it was easy to pass through the shrink tunnel.

5) Modulus of Tensile Elasticity:

Each film sample was subjected to the tensile test of JIS K7127 under the condition mentioned below.

Cross-head Speed: 500 mm/min
Direction: machine direction (MD)
Load Cell: 10 kg

6) Anti-Blocking Characteristic:

Two film samples were adhered to each other under the condition mentioned below, and then peeled under the condition mentioned below, whereupon the peeling strength was measured, from which the anti-blocking characteristic of the film sample was evaluated.

Condition for adhesion:
Temperature: 60° C.
Time: 3 hours
Load: 36 g/cm$^2$
Condition for peeling:
Peeling Speed: 20 mm/min
Load Cell: 2 kg For the anti-blocking characteristic, the two film samples were adhered to each other with the inner surface of one film facing to the inner surface of the other (inner surface/inner surface) or with the outer surface of one film facing to the outer surface of the other (outer surface/outer surface).

7) Cold-Slipping Characteristic:

A thread coated with a film sample was put on a glass sheet coated with the same film sample, and the glass sheet was gradually inclined whereupon the angle ($\theta$) of the glass sheet at which the thread began to slip was measured. The data of tan $\theta$ indicates the slipping characteristic of the sample. In this was used a friction angle meter (manufactured by Toyo Seiki Seisaku-sho Co.), and the test was effected under the following condition.

Relation of Surfaces for the Measurement: inner surface/inner surface, or outer surface/outer surface
Inclining Rate: 2.7°/sec
Thread Weight: 1 kg
Area of Cross Section of Thread: 65 cm$^2$
Interfacial Pressure: 15 g/cm$^2$ 8) Transparency (Haze and Gloss):

The haze and the gloss of each film sample were measured according to JIS K7105, which indicates the transparency of the sample.

EXAMPLE 1

(1) Preparation of Magnesium Compound:

A reactor (inner volume: 500 liters) equipped with a stirrer was fully purged with nitrogen gas, into which were put 97.2 kg of ethanol, 640 g of iodine, and 6.4 kg of metal magnesium, and reacted with stirring under reflux until hydrogen gas was no more formed. Thus was formed a solid reaction product. The reaction mixture containing this solid product was dried under reduced pressure to obtain the intended magnesium compound (carrier of solid catalyst).

(2) Preparation of Solid Catalyst Component:

A reactor (inner volume: 500 liters) equipped with a stirrer was fully purged with nitrogen gas, into which were put 30 kg of the magnesium compound (not ground), 150 liters of pure heptane (n-heptane), 4.5 liters of silicon tetrachloride, and 5.4 liters of di-n-butyl phthalate. The reaction system was kept at 90° C., to which was added 144 liters of titanium tetrachloride with stirring, and reacted at 110° C. for 2 hours. Next, the solid component was separated and washed with pure heptane at 80° C., to which was added 228 liters of titanium tetrachloride and reacted at 110° C. for 2 hours. After having been fully washed with pure heptane, a solid catalyst component was obtained.

(3) Pre-Treatment:

230 liters of pure heptane was put into a reactor (inner volume: 500 liters) equipped with a stirrer, to which were added 25 kg of the solid catalyst component, 1.0 mol/mol, relative to the titanium atom in the solid catalyst component, of triethyl aluminium, and 1.8 mols/mol, relative to the same, of dicyclopentyldimethoxysilane. Next, propylene was introduced into the reactor to have a propylene partial pressure of 0.3 kg/cm$^2$G, and reacted at 25° C. for 4 hours. After the reaction, the solid catalyst component was washed several times with pure heptane, and then processed with carbon dioxide for 24 hours with stirring.

(4) Polymerization:

Into a polymerization reactor (inner volume: 200 liters) equipped with a stirrer, fed was the pre-treated solid catalyst component at a rate of 3 mmols/hr in terms of the titanium atom in the component, along with 4 mmols/kg-PP of triethyl aluminium and 1 mmol/kg-PP of dicyclopentyldimethoxysilane, and propylene and ethylene were fed thereinto and copolymerized at a copolymerization temperature of 80° C. and under a copolymerization pressure (total pressure) of 28 kg/cm$^2$G. In this copolymerization, the ethylene concentration in the reactor was controlled to be 3.2 mol %, while the hydrogen concentration therein was 3.1 mol %, whereby the copolymer obtained might have a predetermined ethylene content and a predetermined molecular weight.

The ethylene concentration and the hydrogen concentration were obtained through compositional analysis of the gaseous phase in the reactor according to gas chromatography.

(5) Formulation of Additives:

The following additives were added to the powdery propylenic copolymer thus obtained, and the resulting mixture was kneaded and extruded out into pellets, using a kneader.

1) Antioxidants
   Irganox 1010 (Ciba Specialty Chemicals): 1000 ppm
   Irgafos 168 (Ciba Specialty Chemicals): 1000 ppm
2) Neutralizing Agent, calcium stearate: 1000 ppm
3) Anti-blocking Aid, silica compound: 2000 ppm
4) Slipping Aid, erucic acid amide: 1000 ppm The resin characteristics of the pellets of the propylenic random copolymer thus obtained were evaluated according to the methods (A) mentioned above. These pellets were sheeted and stretched into stretched films according to the methods (B) through (D) mentioned above. The quality of the films were evaluated according to the methods (E) mentioned above. The data obtained are shown in Table 1 below.

The thickness of each non-stretched sheet was 356 μm and that of each stretched sheet was 12 μm.

EXAMPLE 2

A propylenic random copolymer was produced in the same manner as in Example 1, except that the ethylene concentration and the hydrogen concentration in the copolymerization step (4) were changed to 2.9 mol % and 1.6 mol %, respectively, to thereby control the ethylene content and the molecular weight of the copolymer. This was evaluated according to the methods (A) mentioned above, and the data obtained are shown in Table 1.

Comparative Example 1

A propylenic random copolymer was produced in the same manner as in Example 1, except that diethyl phthalate was used in place of di-n-butyl phthalate, that cyclohexylmethyldimethoxysilane was used in place of dicyclopentyldimethoxysilane, and that the ethylene concentration and the hydrogen concentration in the polymerization step were 2.5 mol % and 3.6 mol %, respectively. This was evaluated according to the methods (A) mentioned above, and the data obtained are shown in Table 1.

Comparative Example 2

A propylenic random copolymer was produced in the same manner as in Example 1, except that diethyl phthalate was used in place of di-n-butyl phthalate, that cyclohexylmethyldimethoxysilane was used in place of dicyclopentyldimethoxysilane, and that the ethylene concentration and the hydrogen concentration in the polymerization step were 3.3 mol % and 2.5 mol %, respectively. This was evaluated according to the methods (A) mentioned above, and the data obtained are shown in Table 1.

Comparative Example 3

A propylenic random copolymer was produced in the same manner as in Example 1, except that the ethylene concentration and the hydrogen concentration in the polymerization step (4) were 2.0 mol % and 5.3 mol %, respectively. This was evaluated according to the methods (A) mentioned above, and the data obtained are shown in Table 1.

Comparative Example 4

In the same manner as in Example 1, a commercially-available polypropylene was sheeted and stretched, and its film quality was evaluated.

The data obtained are shown in Table 1 along with the resin characteristics of the polymer.

TABLE 1

| | Ex. 1 | Ex. 2 | Comp. Ex. 1 | Comp. Exa. 2 | Comp. Ex. 3 | Comp. Ex. 4 |
|---|---|---|---|---|---|---|
| Resin Characteristics | | | | | | |
| Ethylene Content, Wt. % | 4.2 | 4.0 | 3.5 | 4.4 | 3.9 | 4.3 |
| MI, g/10 min | 2.3 | 1.8 | 2.9 | 2.0 | 6.7 | 2.5 |
| Boiling Diethyl Ether Extraction, wt. % | 1.5 | 1.4 | 2.7 | 3.0 | 1.8 | 1.5 |
| Melting Point, °C. | 137.2 | 139.4 | 142.6 | 139.2 | 136.9 | 137.8 |
| Isotactic Triad Fraction, mol % | 99.3 | 99.4 | 97.0 | 96.8 | 99.1 | 97.3 |
| Relaxation Time, τ, sec | 0.532 | 0.584 | 0.525 | 0.563 | 0.376 | 0.544 |
| Film Quality | | | | | | |
| Film Thickness, μ | 12 | 12 | 12 | 12 | — | 12 |
| Shapability | Good | Good | Good | good | Unsheetable | Good |
| Heat-sealing Temperature, °C. | 146 | 147 | 156 | 153 | — | 152 |
| Thermal Shrinkage (%), | | | | | | |
| 80° C. | 5 | 5 | 5 | 10 | — | 10 |
| 100° C. | 15 | 15 | 15 | 20 | — | 20 |
| 120° C. | 40 | 40 | 35 | 40 | — | 40 |
| Outward Appearance of Shrink-wrapped Objects | | | | | | |
| Hot-slipping | Good | Good | Good | Good | — | Good |
| Characteristic | Good | Good | Bad | Bad | — | bad |
| Modulus of Tensile Elasticity, MPa, MD | 1720 | 1950 | 1460 | 1490 | — | 1370 |
| Breaking Elongation/ Strength, %/Mpa | 26/115 | 28/107 | 26/109 | 27/112 | — | 30/116 |
| Anti-blocking Characteristic, N/m² | | | | | | |
| Surface: inner/inner | 24 | 21 | 72 | 77 | — | 108 |
| Surface: outer/outer | 19 | 18 | 60 | 61 | — | 97 |
| Slipping Characteristic, tanθ | | | | | | |
| Surface: inner/inner | 0.37 | 0.36 | 0.42 | 0.39 | — | 0.97 |
| Surface: outer/outer | 0.42 | 0.43 | 0.50 | 0.47 | — | 0.83 |
| Haze/Gloss, %/% | 2.0/127 | 2.2/122 | 1.9/128 | 2.3/124 | — | 1.5/132 |

EXAMPLE 3

Using the propylenic random copolymer obtained in Example 1 (hereinunder referred to as RPP) and the commercially-available polypropylene (this is the same as that prepared in Comparative Example 4, and hereinafter referred to as PP), a multi-layered laminate film was produced according to the method (B), stretched according to the method (C), and then processed according to the method (D).

The multi-layered laminate film had a layer constitution of RPP/PP/RPP in a ratio of 1/2/1.

The thickness of the non-stretched film was 356 μm, and that of the stretched film was 12 μm. The film was evaluated in the same manner as above, and the data obtained are shown in Table 2 below.

EXAMPLE 4

A multi-layered laminate film was produced in the same manner as in Example 3, except that its layer constitution was PP/RPP/PP in a ratio of 1/2/1. This was evaluated in the same manner as above, and the data obtained are shown in Table 2 below.

EXAMPLE 5

Using RPP (obtained in Example 1), PP, and another commercially-available, linear, low-density polyethylene (Moatec 0138N, manufactured by Idemitsu Petrochemical Co.; hereinafter referred to as LL), a multi-layered laminate film was produced according to the method (B), stretched according to the method (C), and then processed according to the method (D).

The multi-layered laminate film had a layer constitution of RPP/(PP+LL)/RPP in a ratio of 1/2/1, in which (PP+LL) was a mixture of 40 wt. % of PP and 60 wt. % of LL.

The thickness of the non-stretched film was 356 μm, and that of the stretched film was 12 μm. The film was evaluated in the same manner as above, and the data obtained are shown in Table 2 below.

Regarding its resin characteristics, LL had MI of 1.3 g/10 min (as measured at 190° C. under a load of 2160 g) and a density of 917 kg/m³.

Comparative Example 5

Using PP and the composition of PP and LL, a multi-layered laminate film was produced according to the method (B), stretched according to the method (C), and then processed according to the method (D).

The multi-layered laminate film had a layer constitution of PP/(PP+LL)/PP in a ratio of 1/2/1, in which (PP+LL) was a mixture of 40 wt. % of PP and 60 wt. % of LL as in Example 5.

The thickness of the non-stretched film and that of the stretched film were the same as those in Example 5. The film was evaluated in the same manner as above, and the data obtained are shown in Table 3 below.

EXAMPLE 6

A multi-layered laminate film was produced in the same manner as in Example 5, except that a composition of (PP+LL) comprised of 90 wt. % of PP and 10 wt. % of LL was used, and that the layer constitution was (PP+LL)/RPP/(PP+LL) in a ratio of 1/2/1. The film was evaluated in the same manner as above, and the data obtained are shown in Table 2 below.

Comparative Example 6

Using PP and the composition of PP and LL, a multi-layered laminate film was produced according to the method (B), stretched according to the method (C), and then processed according to the method (D).

The multi-layered laminate film had a layer constitution of (PP+LL)/PP/(PP+LL) in a ratio of 1/2/1, in which (PP+LL) was a mixture of 90 wt. % of PP and 10 wt. % of LL as in Example 6.

The thickness of the non-stretched film and that of the stretched film were the same as those in Example 6. The film was evaluated in the same manner as above, and the data obtained are shown in Table 3 below.

EXAMPLE 7

Using the composition of RPP (obtained in Example 1) and LL, and LL, a multi-layered laminate film was produced according to the method (B), stretched according to the method (C), and then processed according to the method (D).

The multi-layered laminate film had a layer constitution of (RPP+LL)/LL/(RPP+LL) in a ratio of 1/2/1, in which (RPP+LL) was a mixture of 90 wt. % of RPP and 10 wt. % of LL.

The thickness of the non-stretched film was 356 μm, and that of the stretched film was 12 μm. The film was evaluated in the same manner as above, and the data obtained are shown in Table 2 below.

EXAMPLE 8

A multi-layered laminate film was produced in the same manner as in Example 7, except that the layer constitution was LL/(RPP+LL)/LL in a ratio of 1/2/1. The film was evaluated in the same manner as above, and the data obtained are shown in Table 2 below.

Comparative Example 7

LL was sheeted according to the method (B), stretched according to the method (C), and then processed according to the method (D).

The thickness of the non-stretched film was 356 μm, and that of the stretched film was 12 μm. The film was evaluated in the same manner as above, and the data obtained are shown in Table 3 below.

TABLE 2

|  | Ex. 3 | Ex. 4 | Ex. 5 | Ex. 6 | Ex. 7 | Ex. 8 |
|---|---|---|---|---|---|---|
| Film Quality |  |  |  |  |  |  |
| Film Thickness, μ | 12 | 12 | 12 | 12 | 12 | 12 |
| Shapability | Good | Good | Good | Good | good | Good |
| Heat-sealing Temperature, °C. | 146 | 150 | 141 | 138 | 131 | 106 |
| Thermal Shrinkage (%), |  |  |  |  |  |  |
| 80° C. | 5 | 5 | 15 | 15 | 10 | 15 |
| 100° C. | 20 | 20 | 35 | 35 | 25 | 35 |
| 120° C. | 40 | 40 | 55 | 55 | 50 | 55 |
| Outward Appearance of Shrink-wrapped Objects | Good | Good | Good | Good | Good | Good |
| Hot-slipping Characteristic | Good | Good | Good | Good | Good | Good |
| Modulus of Tensile Elasticity, MPa, MD | 1690 | 1700 | 1030 | 1450 | 520 | 490 |
| Breaking Elongation, % | 26 | 25 | 91 | 35 | 90 | 92 |
| Breaking Strength, MPa | 115 | 116 | 910 | 330 | 900 | 890 |
| Anti-blocking Characteristic, N/m$^2$ |  |  |  |  |  |  |
| Surface: inner/inner | 25 | 28 | 58 | 49 | 77 | 76 |
| Surface: outer/outer | 20 | 24 | 51 | 47 | 69 | 68 |
| Slipping Characteristic, Tanθ |  |  |  |  |  |  |
| Surface: inner/inner | 0.35 | 0.37 | 0.39 | 0.37 | 0.42 | 0.40 |
| Surface: outer/outer | 0.43 | 0.42 | 0.47 | 0.48 | 0.50 | 0.55 |
| Haze, % | 2.0 | 2.3 | 3.0 | 3.1 | 2.1 | 3.2 |
| /Gloss, % | 126 | 127 | 125 | 141 | 130 | 139 |

TABLE 3

| | Comp. Ex. 4 | Comp. Ex. 5 | Comp. Ex. 6 | Comp. Ex. 7 |
|---|---|---|---|---|
| Film Quality | | | | |
| Film Thickness, μ | 12 | 12 | 12 | 12 |
| Shapability | Good | good | Good | Good |
| Heat-sealing Temperature, ° C. | 152 | 146 | 138 | 106 |
| Thermal Shrinkage (%), | | | | |
| 80° C. | 10 | 15 | 15 | 15 |
| 100° C. | 20 | 35 | 35 | 35 |
| 120° C. | 40 | 55 | 55 | 55 |
| Outward Appearance of Shrink-wrapped Objects | Good | Good | Good | Good |
| Hot-slipping Characteristic | Bad | Bad | Bad | Bad |
| Modulus of Tensile Elasticity, MPa, MD | 1370 | 760 | 1190 | 290 |
| Breaking Elongation, % | 30 | 92 | 38 | 102 |
| Breaking Strength, MPa | 116 | 900 | 350 | 980 |
| Anti-blocking Characteristic, N/m² | | | | |
| Surface: inner/inner | 108 | 100 or more | 94 | 100 or more |
| Surface: outer/outer | 97 | 100 or more | 97 | 100 or more |
| Slipping Characteristic, Tanθ | | | | |
| Surface: inner/inner | 0.97 | 0.94 | 0.98 | 0.92 |
| Surface: outer/outer | 0.83 | 0.85 | 0.79 | 0.90 |
| Haze, % | 1.5 | 2.9 | 3.0 | 4.0 |
| /Gloss,% | 132 | 126 | 142 | 137 |

As has been mentioned hereinabove in detail, the propylenic random copolymer of the invention has a high degree of crystallinity, and, contains few sticky components while a high melting point. Therefore, the film of the copolymer has good heat-sealability, stiffness, anti-blocking ability and slipping ability. In addition, since the film is well stretchable, it is favorably usable in various fields.

The propylenic random copolymer composition of the invention also exhibits the favorable characteristics of the copolymer therein, while being further improved by the polyolefinic polymer constituting it.

The film, especially the stretched film of the invention is stably produced by sheeting the propylenic random copolymer or its composition having good stretchability and low-temperature heat-sealability. In particular, the stretched film is stably produced by biaxially stretching the film of the copolymer or its composition. In addition, the stretched film has good stiffness, low-temperature heat-sealability, heat-shrinkability, hot-slipping ability, anti-blocking ability and cold-slipping ability.

The multi-layered laminate film of the invention, which comprises at least one layer of the propylenic random copolymer or its composition, is stably produced by sheeting the copolymer or its composition along with other sheeting resins. The laminate film can be biaxially stretched to give a stretched, multi-layered laminate film, like the non-laminated film, and the biaxial stretching of the laminate film is effected stably. As comprising the film layer of the propylenic random copolymer or its composition, the stretched, multi-layered laminate film has good stiffness and heat-shrinkability. In particular, the laminate film having the layer of the propylenic random copolymer or its composition as the outermost layer has significantly excellent low-temperature heat-sealability, hot-slipping ability, anti-blocking ability and cold-slipping ability.

Without requiring any α-olefins having 4 or more carbon atoms, such as 1-butene, the invention gives high-quality films of the binary random copolymer of ethylene and propylene. Therefore, in the invention, the costs of the monomers needed can be reduced. In addition, since the amount of the comonomer to be used in the invention is small, the copolymer is produced with ease. Using the copolymer, the invention gives such high-quality films.

While the invention has been described in detail and with reference to specific embodiments thereof, it will be apparent to one skilled in the art that various changes and modifications can be made therein without departing from the spirit and scope thereof.

What is claimed is:

1. A multi-layered laminate film comprising at least one layer of a propylenic random copolymer of propylene and ethylene that satisfies the following conditions (1) to (5):

(1) the ethylene unit content (x, wt. %) of the copolymer is from 0.2 to 10 wt. %;

(2) the copolymer has a melt index (MI, g/10 min) of from 0.1 to 4 g/10 min.;

(3) the relation between the boiling diethyl ether extraction (E, wt. %) of the copolymer and x satisfies the formulae (I) or (II)

$$E \leq 0.25x + 1.1 \quad (0.2 \leq x < 6) \quad \text{(I)}$$

$$E \leq 2.6 \quad (6 \leq x \leq 10) \quad \text{(II)};$$

(4) the relation between the melting point (Tm, ° C.) of the copolymer as measured with a differential scanning calorimeter and x satisfies the formula (III):

$$Tm \leq 165 - 5x; \text{ and} \quad \text{(III)}$$

(5) the isotactic triad fraction (mm, mol %) in the PPP sequence of the copolymer, as measured in $^{13}$C-NMR, is not smaller than 98.0 mol %.

2. The multi-layered laminate film of claim 1 comprising at least one layer of propylenic random copolymer and one or more layers of other thermoplastic resins.

3. The multi-layered laminate film as claimed in claim 1, in which the layer of the propylenic random copolymer is the inner layer of the film.

4. The multi-layered laminate film as claimed in claim 1, that is stretched and in which the layer of the propylenic random copolymer is at least the outermost layer of one surface of the film.

5. The multi-layered laminate film of claim 1 that is stretched.

6. The multi-layered laminate film of claim 2 that is stretched.

7. The multi-layered laminate film of claim 1 produced by preparing a multi-layered laminate film followed by stretching it.

8. The multi-layered laminate film as claimed in claim 5, in which the layer of the propylenic random copolymer is the inner layer of the film.

9. The stretched, multi-layered laminate film as claimed in claim 5, in which the layer of the propylenic random copolymer is at least the outermost layer of one surface of the film.

10. The multi-layered laminate film of claim 1, wherein the propylenic random copolymer further satisfies the following condition (6):

(6) the relation between the melt index (MI, g/10 min) of the copolymer and the time of relaxation (τ, sec) of the copolymer as obtained through frequency dispersion measurement at a frequency of ω0=10° rad/sec satisfies the formula (IV):

$$\tau \geq 0.523 - 0.077 \log MI \tag{IV}$$

11. The multi-layered laminate film of claim 1, wherein said at least one layer of propylenic random copolymer comprises 60 to 95 wt. % of said propylenic random copolymer and 5 to 40 wt. % of a polyolefinic polymer.

* * * * *